US012586508B2

(12) United States Patent　　　　　(10) Patent No.:　US 12,586,508 B2
Howard et al.　　　　　　　　　　　　(45) Date of Patent:　Mar. 24, 2026

(54) ASYNCHRONOUS DISPLAY PIXEL DATA STREAMING OVER I/O CONNECTIONS

(71) Applicant: Intel Corporation, Santa Clara, CA (US)

(72) Inventors: John S. Howard, Portland, OR (US); Douglas R. Huard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 17/554,132

(22) Filed: Dec. 17, 2021

(65) Prior Publication Data

US 2022/0108649 A1　　Apr. 7, 2022

(51) Int. Cl.
　　*G09G 3/20*　　　　(2006.01)
　　*G06F 3/14*　　　　(2006.01)
　　(Continued)

(52) U.S. Cl.
　　CPC ............. *G09G 3/2096* (2013.01); *G06F 3/14* (2013.01); *G06F 13/42* (2013.01);
　　(Continued)

(58) Field of Classification Search
　　CPC .............. G09G 5/006; G09G 2370/10; G09G 2370/042; G09G 2370/04; G09G 2354/00; G09G 2340/16; G09G 3/2096; G09G 2310/04; G09G 2370/16; G09G 5/005; G09G 2370/00; G09G 5/003; G09G 5/391; G09G 5/14; G09G 2370/12; G09G 2370/047; H04L 67/01; H04L 47/10; H04L 47/35; H04L 47/41; H04N 13/194;
　　(Continued)

(56) References Cited

U.S. PATENT DOCUMENTS 11,763,774 B2 *　9/2023　Ansari .................. G09G 5/008
　　　　　　　　　　　　　　　　　　　　345/520
12,271,249 B2 *　4/2025　Ansari .................. G06F 1/3265
　　　　　(Continued)

FOREIGN PATENT DOCUMENTS

WO　　　2009140963 A1　11/2009

OTHER PUBLICATIONS

EPO European Extended Search Report in EP Application Serial No. 22213198.9 mailed on Apr. 21, 2023, 11 pages.
(Continued)

*Primary Examiner* — Dismery Mercedes
(74) *Attorney, Agent, or Firm* — Alliance IP, LLC

(57)　　　　　　ABSTRACT

In one embodiment, a system includes a display source to generate pixel data for a frame to be displayed, generate a display update notification message comprising information about the pixel data, and generate a display data message comprising the pixel data. The system also includes translation circuitry to generate one or more first packets comprising the information in the display update notification message and formatted according to an input/output (I/O) protocol based on the display update notification message, and generate one or more second packets comprising the pixel data and formatted according to the I/O protocol based on the display data message. The system further includes input/output circuitry to transmit the first and second data packets across a link based on the I/O protocol.

20 Claims, 10 Drawing Sheets

(51) Int. Cl.

| | |
|---|---|
| *G06F 13/42* | (2006.01) |
| *G09G 5/00* | (2006.01) |
| *G09G 5/14* | (2006.01) |
| *H04L 47/10* | (2022.01) |

(52) U.S. Cl.
CPC ......... *G06F 13/4282* (2013.01); *G09G 5/006* (2013.01); *G09G 5/14* (2013.01); *H04L 47/10* (2013.01); *G06F 2213/0026* (2013.01); *G09G 2340/16* (2013.01); *G09G 2354/00* (2013.01); *G09G 2360/12* (2013.01); *G09G 2370/042* (2013.01); *G09G 2370/10* (2013.01)

(58) Field of Classification Search
CPC ....... H04N 5/775; G06F 3/14; G06F 13/4282; G06F 13/4004
See application file for complete search history.

(56) References Cited

U.S. PATENT DOCUMENTS

| | | | |
|---|---|---|---|
| 2002/0011996 A1 | 1/2002 | Inoue et al. | |
| 2006/0168496 A1* | 7/2006 | Steele .................. | H04L 1/0045 |
| | | | 714/758 |
| 2010/0165912 A1* | 7/2010 | Funabiki .......... | H04N 21/43637 |
| | | | 370/328 |
| 2012/0218276 A1 | 8/2012 | Kohda et al. | |
| 2013/0195119 A1* | 8/2013 | Huang .................. | H04L 65/762 |
| | | | 370/468 |
| 2014/0181354 A1* | 6/2014 | Yi ....................... | G06F 13/4022 |
| | | | 710/313 |
| 2016/0041936 A1* | 2/2016 | Lee ..................... | G06F 12/0866 |
| | | | 710/313 |
| 2016/0080645 A1* | 3/2016 | Ohba .................. | H04N 13/383 |
| | | | 348/207.11 |
| 2016/0270145 A1* | 9/2016 | Srinivasa Gopalan ..................... | |
| | | | H04L 65/1083 |
| 2017/0064370 A1* | 3/2017 | Wang ....................... | G09G 5/00 |
| 2018/0060261 A1* | 3/2018 | Chhor ................ | G06F 13/4282 |
| 2018/0130443 A1* | 5/2018 | Ansari .................... | G09G 5/14 |
| 2019/0042177 A1* | 2/2019 | Tanner ................. | G06F 3/1454 |
| 2019/0043458 A1* | 2/2019 | Kwa ....................... | G09G 5/363 |
| 2019/0045236 A1* | 2/2019 | Kambhatla ............. | G09G 5/00 |
| 2020/0044895 A1 | 2/2020 | Mittal et al. | |

OTHER PUBLICATIONS

EPO Communication Pursuant to Article 94(3) EPC in EP Application Serial No. 22 213 198.9 mailed on Nov. 26, 2025, 8 pages.

* cited by examiner

500

| Byte | +0 | | | +1 | | | | | | +2 | | | +3 | |
|---|---|---|---|---|---|---|---|---|---|---|---|---|---|---|
| DWORD | 7 6 5 4 3 2 1 0 | | | 7 6 5 4 3 2 1 0 | | | | | | 7 6 5 4 3 2 1 0 | | | 7 6 5 4 3 2 1 0 | |
| 0 | Fmt | Type | R | TC | R | Attr | R | TH | TD | EP | Attr | AT | Length | | |
| 1 | Requester ID | | | | | | | | | Tag | | | Msg Code | | |
| 2 | Bus, Device, Function (BDF) | | | | | | | | | Vendor | | | | | |
| 3 | Protocol | | | Target Pin | | | | | | Available to App | | LBE | Msg Code | | |

| 7 6 5 4 3 2 1 0 | | |
|---|---|---|
| EOM | Reserved | Ext | Packet Type |

ASYNCHRONOUS DISPLAY PIXEL DATA STREAMING OVER I/O CONNECTIONS

BACKGROUND

In existing platforms, display pixel data is output to a display controller via a synchronous protocol, e.g., DisplayPort (DP) or embedded DisplayPort (eDP), which require that the host device deliver pixel data using a prescriptive, pixel synchronous protocol. The synchronicity required by these protocols require tight timing and controls for the host and the display controller. Further, the use of these protocols may require additional cabling beyond required input/output (I/O) or other data transport cabling.

DETAILED DESCRIPTION

Figure 1:
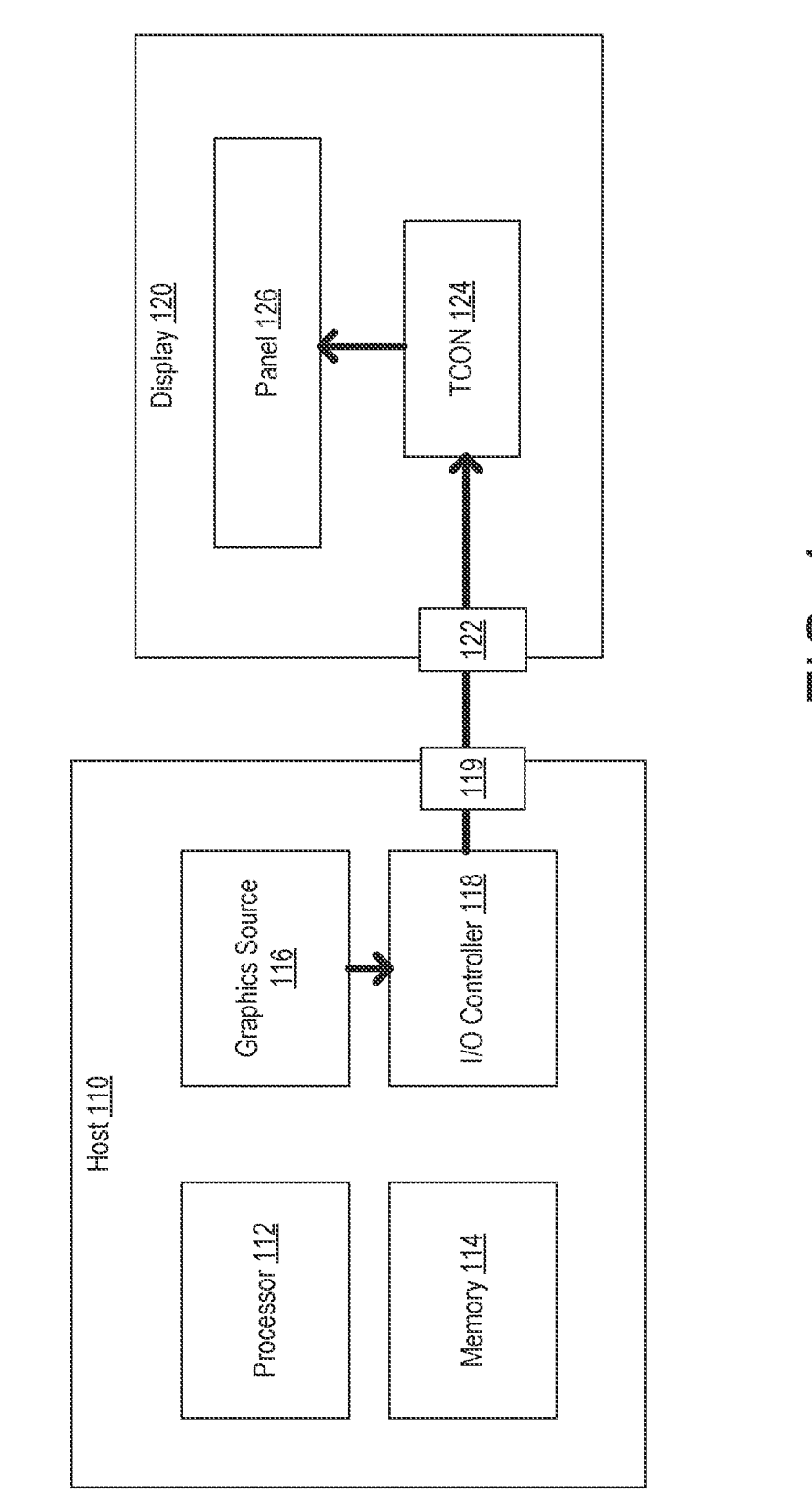
FIG. 1 illustrates an example system that includes a host streaming pixel data to a display asynchronously in accordance with embodiments of the present disclosure.

Embodiments described herein use a novel, simple, and efficient peer-to-peer, message-based protocol to communicate display pixel data from a display source to a display sink via an asynchronous protocol. In particular, aspects of the present disclosure may simplify pixel streaming requirements by relaxing the tight (isochronous) timing constraints of a display streaming pipeline, which are required by current display streaming protocols such as DisplayPort (DP)-based protocols (e.g., embedded DisplayPort (eDP)). Further, by relaxing the timing constraints, the display streaming protocol described herein may be implemented alongside or over existing input/output (I/O) communication protocols, such as Peripheral Component Interconnect Express (PCIe)-based protocols, Compute Express Link (CXL)-based protocols, Universal Serial Bus (USB)-based protocols, Internet Protocol (IP), or the like.

For instance, due to the nature of eDP being pixel synchronous, existing eDP solutions can run no faster than the pixel stream itself, which can keep memory and infrastructure active to support a comparatively low bandwidth synchronous data stream. As an example, for full frames of data, there is no effective idle time for the display source or the eDP link. By eliminating the pixel-synchronous requirement, a display source can potentially run as fast as the I/O bus can accept data, resulting in a significant idle time increase (e.g., 80 to 90 percent idle per full frame, depending on resolution, refresh rate, etc.). The resultant idle time will realize power savings for the display source, along with internal and external links associated with the display streaming, and the relatively long idle periods may allow further power saving opportunities.

Furthermore, by allowing the data to be streamed as fast as the I/O bus can accept data, display pixel data can arrive at the display sink (e.g., the TCON of the display) well ahead of when it is needed for the panel, which can provide a new baseline for constructing new quality, power efficiency, and/or responsiveness features in the display itself. These opportunities are not possible with the existing display system architecture due to the issues described above with current protocols.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings, or positions that vary slightly from the meaning of the unmodified term. For example, description of a lid of a mobile computing device that can rotate to substantially 360 degrees with respect to a base of the mobile computing includes lids that can rotate to within several degrees of 360 degrees with respect to a device base.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates an example system 100 that includes a host 110 streaming pixel data to a display 120 asynchronously in accordance with embodiments of the present disclosure. The example host 110 includes a processor 112 (e.g., a central processing unit (CPU)), memory 114 (e.g., cache memory), a graphics source 116 (e.g., a graphics processing unit (GPU)), an I/O controller 118, and an I/O interface 119 that connects to a corresponding I/O interface 122 of the display 120. The display 120 also includes a timing controller (TCON) 124 and a display panel 126. The processor 112 includes circuitry for executing instructions. In some instances, the processor 112 may include with one or more cores (not shown). The memory 114 may include any suitable volatile or non-volatile memory to store data. For instance, the memory 114 may be used to store instructions executed by the processor 112 and/or the graphics source 116. For instance, the memory 114 may store frame data generated by the graphics source 116 prior to the frame data being transmitted to the display 120. In some embodiments, memory 114 may include one or more levels of a cache hierarchy. The graphics source 116 may generate the frame data that is communicated to the display 120. In the embodiment depicted, the graphics source 116 is a discrete component, though in other embodiments, the graphics source 116 may be integrated with processor 112.

The I/O controller 118 includes circuitry for facilitating communications between the host 110 and one or more endpoint devices (e.g., the display 120) according to an I/O protocol. For example, in some embodiments, the I/O controller 118 may be a Peripheral Component Interconnect Express (PCIe) root complex, Compute Express Link (CXL) controller, a Universal Serial Bus (USB) controller, or another type of controller for implementing an interconnect protocol. The examples described below assume a PCIe I/O controller and protocol; however, embodiments may implement any suitable I/O protocol without deviating from the spirit of the present disclosure.

In the example shown, the graphics source 116 generates frame data and provides the frame data to the I/O controller 118 without any timing data (e.g., without any pixel clock data as in DP-based protocols). In other embodiments, the I/O controller 118 may obtain the frame data from the graphics source 116 via the memory 114. The I/O controller 118 provides the frame data to the TCON 124 via the I/O protocol without any timing data (i.e., asynchronously), and the TCON 124 then converts the frame data received into signals that drive the panel 124 to display the intended frames/images. In this way, the TCON 124 may update the panel 126 approximately when the frame data is received from the I/O controller 118. In contrast, in typical display data streaming scenarios, the frame data is provided using a synchronous protocol (e.g., DisplayPort (DP)-based protocols), which sends timing data associated with the frame data, and the TCON drives the panel 126 using the frame data and the timing data. For instance, isochronous behavior may require implementation of pixel synchronous support not just over the link but extending all the way back to the source of the pixel data being consumed by the I/O controller (e.g., from memory 114 or graphics source 116), and the I/O controller must deliver on the isochronous demand.

Figure 2:
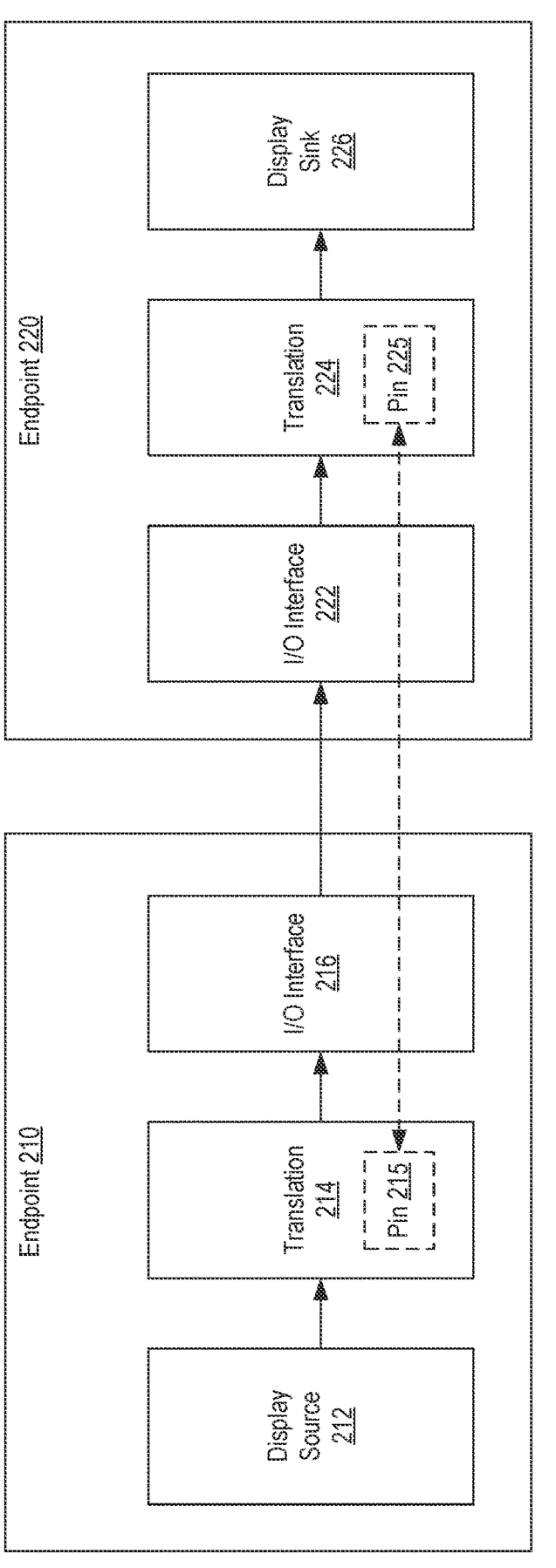
FIG. 2 illustrates an example endpoint-to-endpoint display data streaming scenario in accordance with embodiments of the present disclosure.

FIG. 2 illustrates an example endpoint-to-endpoint display data streaming scenario in accordance with embodiments of the present disclosure. In the example shown, a first endpoint 210 generates frame data and sends it to a second endpoint 220, which displays the frame data. The endpoint 210 may be implemented similar to the host 110 and the endpoint 220 may be implemented similar to the display 120 of FIG. 1, in certain embodiments.

In the example shown, the endpoint 210 includes a display source 212 that generates frame data, translation circuitry 214, and an I/O interface 216, while the endpoint 220 includes I/O circuitry 222 (that interfaces with the I/O interface 216 of the endpoint 210), translation circuitry 224 (which may be implemented similar to the translation circuitry 214 of the endpoint 210), and a display sink 226, which consumes the frame data generated by the display source 212.

The translation circuitries 214, 224 each include circuitry for converting asynchronous display data streaming messages (as described further below) into packets compatible with the I/O protocol and interfaces 216, 222. For example, where a PCIe-based protocol is implemented, the translation circuitries 214 may convert asynchronous display data streaming messages into transaction layer packets (TLPs) that are sent across the link between the endpoints 210, 220. In some instances, the translation circuitries may convert the asynchronous display data streaming messages into PCIe vendor defined message (VDM) TLPs, e.g., as described further below, and the VDM TLPs may use a Route-by-ID addressing mode. VDM TLPs may be implemented because they route to where you need them using Route-by-ID and they don't have any system semantics required or implied. Thus, the VDM TLPs may effectively act as a write-only protocol that carries only data.

The translation circuitries 214, 224 may accordingly provide a functional abstraction to the display source 212, taking care of segmenting the asynchronous display data streaming messages into data packets (e.g., TLPs), flow control, and/or message transmission prioritization for the display source 212. As used herein, "message" may refer to data transmitted between the display source 212 and the translation circuitry 214 or between the display sink 226 and the translation circuitry 224, e.g., in a delimited message format where each message is delineated with an end of message (EOM) indication.

In some embodiments, the translation circuitries 214, 224 may define logical pins 215, 225 that represent different logical endpoints. The pins may be addressed, in PCIe-based embodiments, for example, according to a pin identifier (e.g., number) and a Bus, Device, Function (BDF) number of its endpoint device. That is, messages of the asynchronous display data streaming protocol may be addressed according to a unique pin number and the BDF of the pin's endpoint device. The pins 215, 225 may be bound together at runtime by software on one or both of the endpoint devices 210, 220 (e.g., during boot flows, or by an operating system at its runtime). In some instances, the pins may track and manage "credits" that are used as a flow control mechanism for data messages transmitted between the pins. In certain embodiments, the translation circuitries 214, 224 may implement multiple pins, e.g., where an endpoint receives data from multiple sources (with corresponding pin pairs for each source/endpoint combination) or where a source may transmit display data to multiple endpoints (also with corresponding pin pairs for each source/endpoint combination).

The asynchronous display data streaming messages as described herein may include at least two particular types of messages: data messages and notification messages. In certain instances, a notification message may be sent prior to any data message, i.e., each data message may have one corresponding notification message that is sent prior to it. The notification message may include metadata that describes the subsequent data message, which may includes frame/pixel data. In some embodiments, the notification messages may include one or more flag bits that indicate information about the frame data in the subsequent data message. For example, the flag bits may include a partial update (PU) indicator/bit(s) that indicates the subsequent data message includes only changed data of a frame, i.e., only the data of the frame that has changed from a previous frame. As another example, the flag bits may include a frame end (FE) indicator/bit(s) that indicates an end of frame, which may indicate that the subsequent data message is the last data message that may be received for a particular frame. As another example, the flag bits may include a CRC check indicator (CE) bit that indicates a CRC check is to be performed on the data in the subsequent message. In addition, the notification message may also include an indication of a length of the data message that is to follow (this can be used by the sink 440 to ensure all of a data message has been received).

There may be other types or uses of notification messages, and the notification messages do not necessarily need to have a data message that follows. For example, notification messages may be used to indicate that a display sink is ready to receive data (e.g., after a grant of flow control credits) or to indicate to a display source to no longer send messages, or to send a cyclic redundancy check (CRC) code for error checking of received data (e.g., as described below).

The data messages may include frame data and in some embodiments, can include data of an arbitrary length. Because of this, the data messages may include data that spans multiple data packets of the implemented I/O protocol. For instance, a single data message with frame data can be translated by the translation circuitry 214 into multiple VDM TLPs (in a PCIe-based embodiment).

The display source 212 may generate the notification and associated data message for any new frame data that it generates. For instance, the display source 212 may generate a new frame or a partial update to a frame (either of which may be referred to as frame data) and first send a notification message to the display sink 226 that indicates information about the new frame data, and then send a data message to the display sink 226 with the new frame data. The translation circuitry 214 may then segment the messages into multiple data packets compatible with the I/O protocol implemented by the I/O interfaces (e.g., PCIe VDM TLPs). At the endpoint 220, the translation circuitry 224 receives and reassembles the multiple data packets into the original message sent by the display source 212 and provides the assembled message to the display sink 226.

Figure 3:
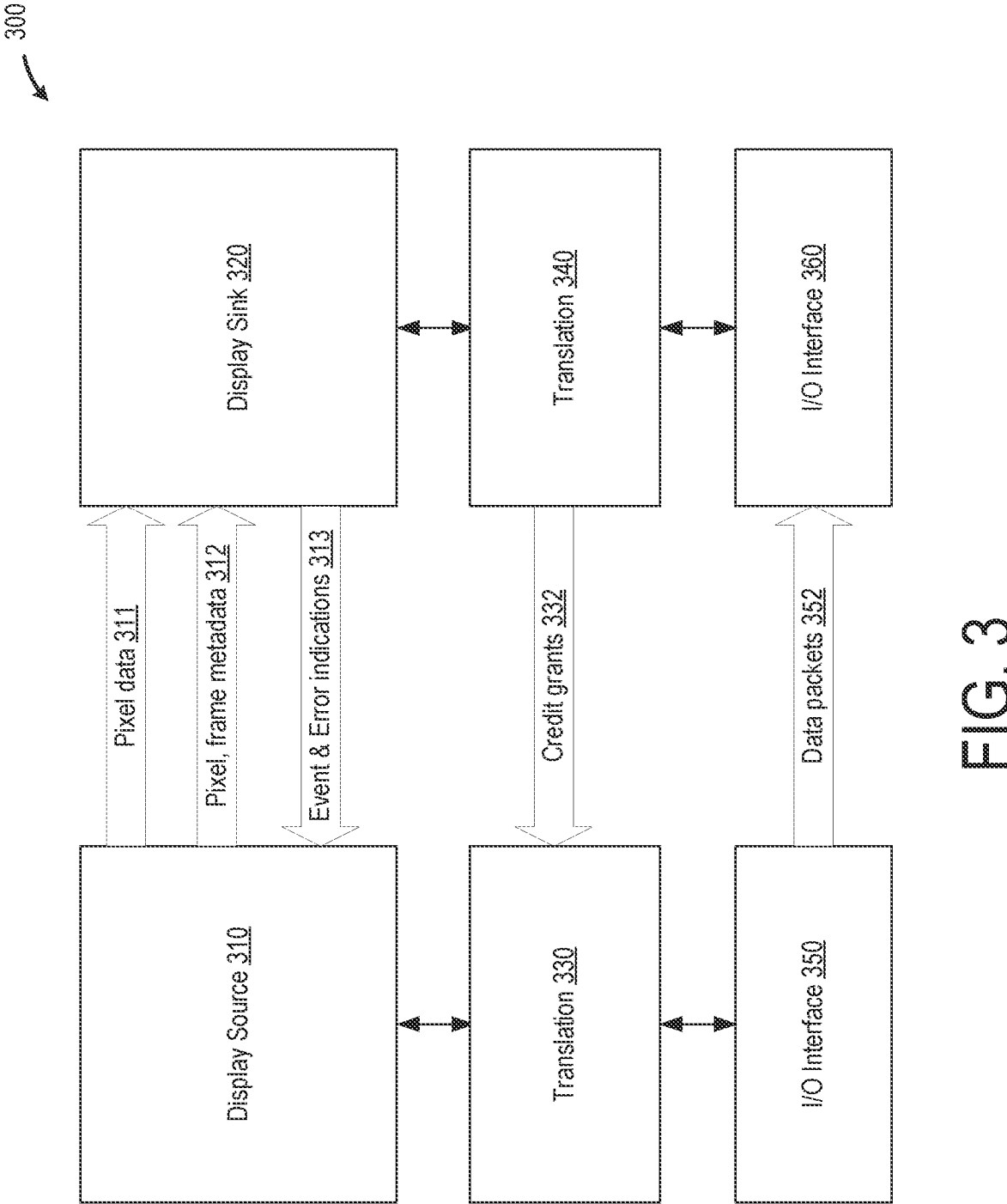
FIG. 3 illustrates an example capability layering stack for the scenario shown in FIG. 2.

FIG. 3 illustrates an example capability layering stack 300 for the scenario shown in FIG. 2. As shown, the display source 310 (which may be implemented similar to the display source 212) generates and transmits to the display sink 320 pixel data 311 as well as pixel and/or frame metadata 312, while the display sink 320 generates event and error indications 313 (e.g., detection of data transmission errors, e.g., via cyclic redundancy checks, etc.). In some embodiments, additional data may be transmitted along with the pixel data, such as touch data indicating a touch or other interaction with a display panel associated with the display sink 320.

Meanwhile, the translation circuitries 330, 340, manage and track flow control credits 332. For instance, the translation circuitry 340 may transmit credit grant messages to the translation circuitry 330, which then tracks the usage of those credits (or consumes the granted credits) as data is transmitted over the link. In some instances, the translation circuitry 330 may not transmit data where no credits have been granted by the translation circuitry 340, while in other instances, the link may not utilize any credit tracking at all. Finally, the I/O interface circuitry 350 transmits the data packets 352 to the I/O interface circuitry 360 that have been generated by the translation circuitry 330 based on the asynchronous display streaming messages generated by the display source 310.

Figure 4:
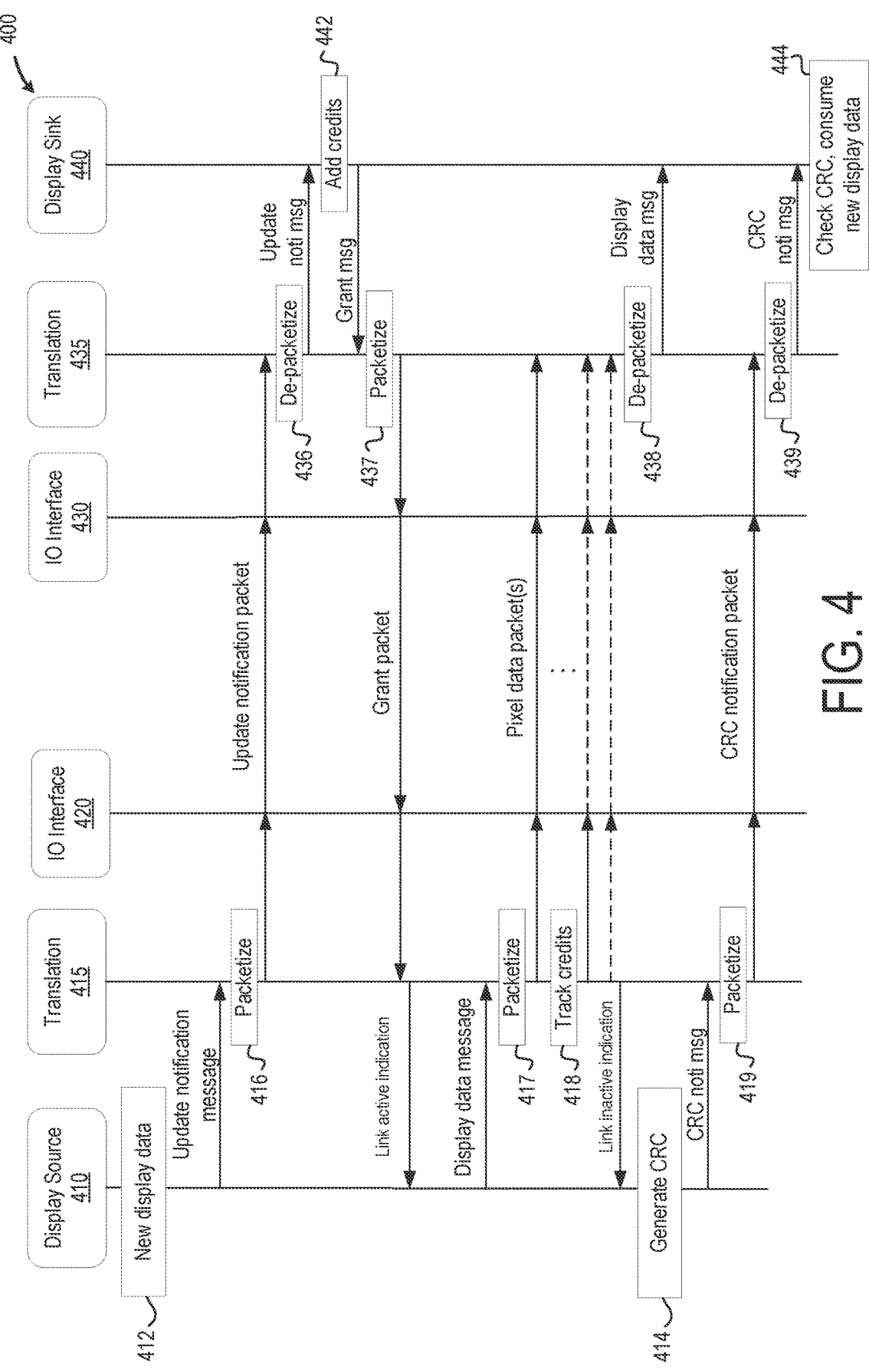
FIG. 4 illustrates a sequence diagram of an example asynchronous display streaming between a display source and display sink in accordance with embodiments of the present disclosure.

FIG. 4 illustrates a sequence diagram 400 of an example asynchronous display streaming between a display source and display sink in accordance with embodiments of the present disclosure. In the example flow shown, the display source 410 (which may be implemented similar to the host 110 of FIG. 1, display source 212 of FIG. 2, and/or display source 310 of FIG. 3) generates new display data at 412. The new display data may include pixel data for a full frame update or partial frame update. The display source 410 then sends an update notification message to the translation circuitry 415, which packetizes the update notification message at 416 into one or more data packets of the I/O protocol (e.g., a VDM TLP) and sends the data packet to the I/O interface 420. The last packet corresponding to the update notification message may include an end of message (EOM) flag (e.g., in a PCIe TLP header bit in PCIe embodiments, or otherwise where other I/O protocols are used) that indicates to the translation circuitry 435 it is the last in a stream of notification packets. This is the case even when there is only one packet sent for the notification message. The data packet(s) is delivered to the I/O interface 430 over an I/O link and is provided to the translation circuitry 435, which de-packetizes the data packet at 436 and then provides the update notification message to the display sink 440.

In response, the display sink 440 adds link transmission credits at 442 and generates a credit grant message for transmission back to the display source 410. The credit grant message is packetized at 437 by the translation circuitry 435 and the data packet is transmitted across the link. The translation circuitry 415 de-packetizes and consumes the credit grant message (for credit tracking/consumption purposes) and sends a link active indication to the display source 410 to indicate the link is now in an active state. In this time, the display source 410 has not transmitted any data message, as it has not yet been granted credits as described. However, in some embodiments, the asynchronous display data streaming may be implemented without credit tracking/consumption.

Once granted credits, the display source 410 transmits a display data message that includes all of the new display data generated at 412. The display data message includes no timing information associated with the display data, as would display data packet/message of a synchronous protocol such as DisplayPort (DP). The translation circuitry 415 packetizes the display data message into a number of data packets at 417 and transmits the data packets across the link as shown. On the receiver side, the translation circuitry 438 de-packetizes the data, e.g., collects the packet payload data, and provides the data display message to the display sink 440. Although shown as de-packetizing the data packets then sending one display data message thereafter, in some embodiments, the translation circuitry 435 may deliver the display data to the display sink 440 as it arrives and is extracted from the data packets. As the data is packetized and sent across the link, the translation circuitry 415 consumes the granted credits at 418 to ensure that data is only sent when credits are available. The last packet corresponding to a display data message may include an end of message (EOM) flag (e.g., in a TLP header bit) that indicates to the translation circuitry 435 it is the last in a stream of display data message packets. Once the credits run out, the translation circuitry 415 may send a link inactive indication to the display source 410 indicating the link is now in an inactive state.

Next, the display source 410 generates a cyclic redundancy check code (CRC) at 414 and sends a CRC notification message that includes or encapsulates the CRC code. As before, the translation circuitry 415 packetizes the CRC notification messages and sends the data packet(s) across the I/O link, and the translation circuitry 435 de-packetizes the CRC data packet and provides the CRC notification message (with the CRC code encapsulated therein) to the display sink 440. The display sink 440 then checks the CRC, and if validated, consumes the new display data at 444. In some embodiments, however, CRC checking might not be implemented, or may only be selectively implemented. For instance, in PCIe-based embodiments, CRC checking may be built into the I/O protocol; thus, the CRC notification message may be redundant, and accordingly, not sent in such scenarios. In PCIe-based embodiments, the display sink 440 may consume the data as it is received from the translation circuitry 435, since the CRC check may be performed at the I/O interface 430 prior to de-packetization by the translation circuitry 435.

If the display sink 440 detects an error in the data received, it may send an error notification message back across the link to the display source 410. After transmitting the error notification message, the display sink 440 may wait for an error acknowledgement notification message back from the display source 410. In addition, in some embodiments, the display sink 440 may cause the translation circuitry 435 to revoke any flow control credits on the link that are still outstanding. When the display source 410 receives/detects the error notification message from the display sink 440, it may cease transmitting display pixel data for a current frame and any data still remaining to be sent over the link may be cleared (e.g., by the translation circuitry 415). For instance, if the translation circuitry 415 is in the middle of packetizing a data message, it may immediately terminate the message by setting an EOM field in the next data packet. The display source 410 may transmit an error acknowledgement notification message to the display sink 440 as well, and advance to sending data for the next frame.

Figure 5:
FIG. 5 illustrates an example VDM TLP header format that may be used in embodiments of the present disclosure.

FIG. 5 illustrates an example VDM TLP header format 500 that may be used in embodiments of the present disclosure. The example TLP header format may be used for both notification messages and data messages. In the example shown, the first 3 DWORDs of the TLP header are according to the PCIe specification, with Bytes 2, 3 of DWORD 2 indicating a particular vendor for the vendor-defined format. DWORD 3 of the TLP header includes a protocol field that includes the protocol-specific bits (e.g., the EOM bit and packet type indicator bits shown), a target pin field to indicate a destination pin of a link, an "available to app" field, an LBE field, and a Msg Code field. For notification messages, the translation circuitry (e.g., 415) may format the fields as follows. The Fmt field may be set to Msg for notifications that have no TLP payload (i.e., Length equal to zero), and set to MsgD for notifications with payloads (i.e., Length>zero). The "Available to App" field in DWORD 3 may be used encode the type of notification, e.g., a display update notification (indicating new display data is coming thereafter in a data message), a CRC notification, an error notification, error acknowledgment notification, etc.

For data messages, the translation circuitry (e.g., 415) may format the fields as follows. Since data messages can be arbitrarily long, the Length and LBE field values depend on the payload of the TLP instance. The packets associated with each message may be annotated with the same type value in the protocol field. Additionally, since all messages may be delimited (and can be any byte boundary), the EOM and LBE fields allow explicit annotation of the byte locate of the last byte of the message.

Figure 6:
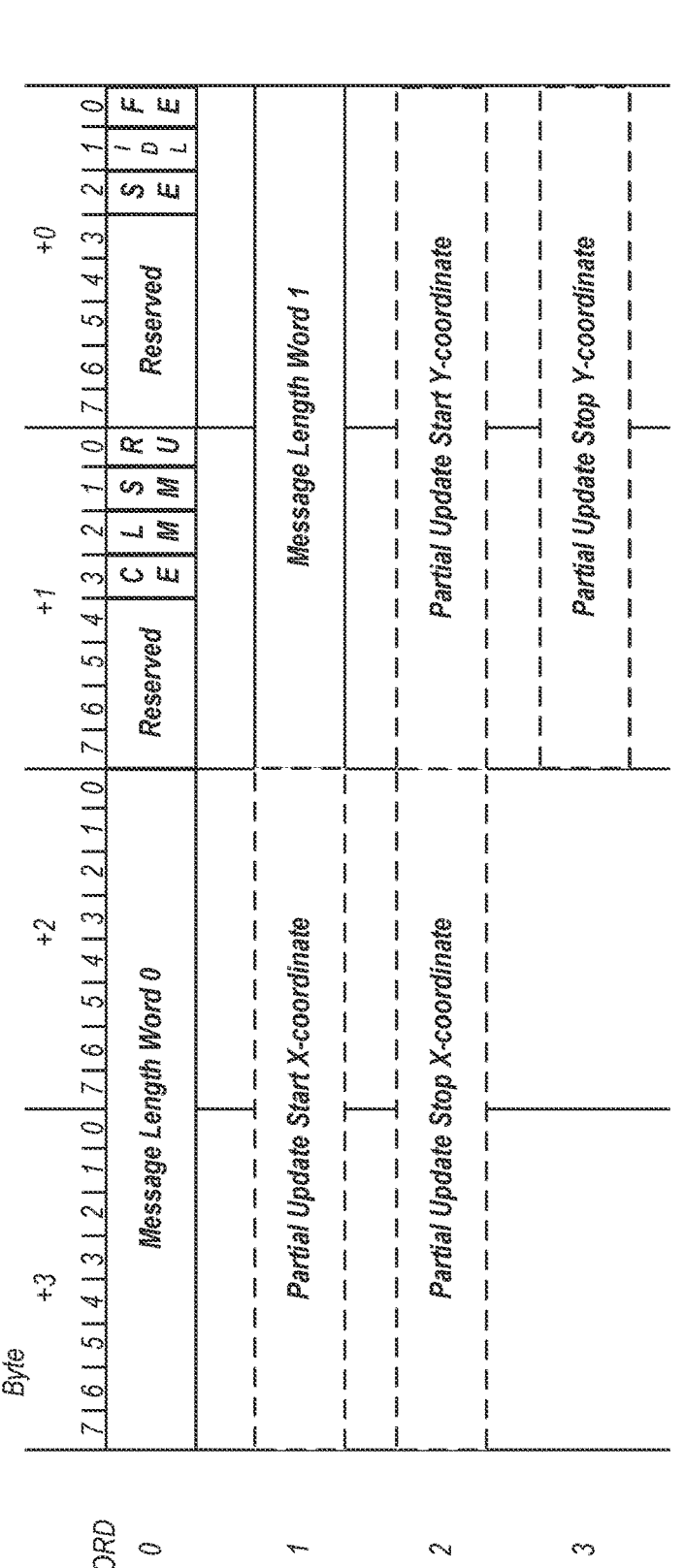
FIG. 6 illustrates an example VDM TLP payload format that may be used for display update notifications in embodiments of the present disclosure.

FIG. 6 illustrates an example VDM TLP payload format 600 that may be used for display update notifications in embodiments of the present disclosure. As described above, the display update notification message may be sent by a display source prior to sending display data message, and may be used to provide metadata about the display data message (e.g., via the FE and CE bits in DWORD 0, bytes 0, 1 (respectively), as described above). In addition, the display update notification message may be used to configure the display sink's behavior regarding the corresponding display data message. The display update notification message may include the length of the display data message (e.g., in DWORD 0, bytes 2-3 and DWORD 1, bytes 0-1 as shown) so that the display sink may compare actual the length of the received message against the expected length of the message (for error-reporting purposes). The display update notification message may also contain the first and last vertical and horizontal pixel coordinates contained in the display data update (e.g., for partial updates), which may allow the received pixel data to be written into the frame buffer at the correct locations.

Figures 7A, 7B, 7C:
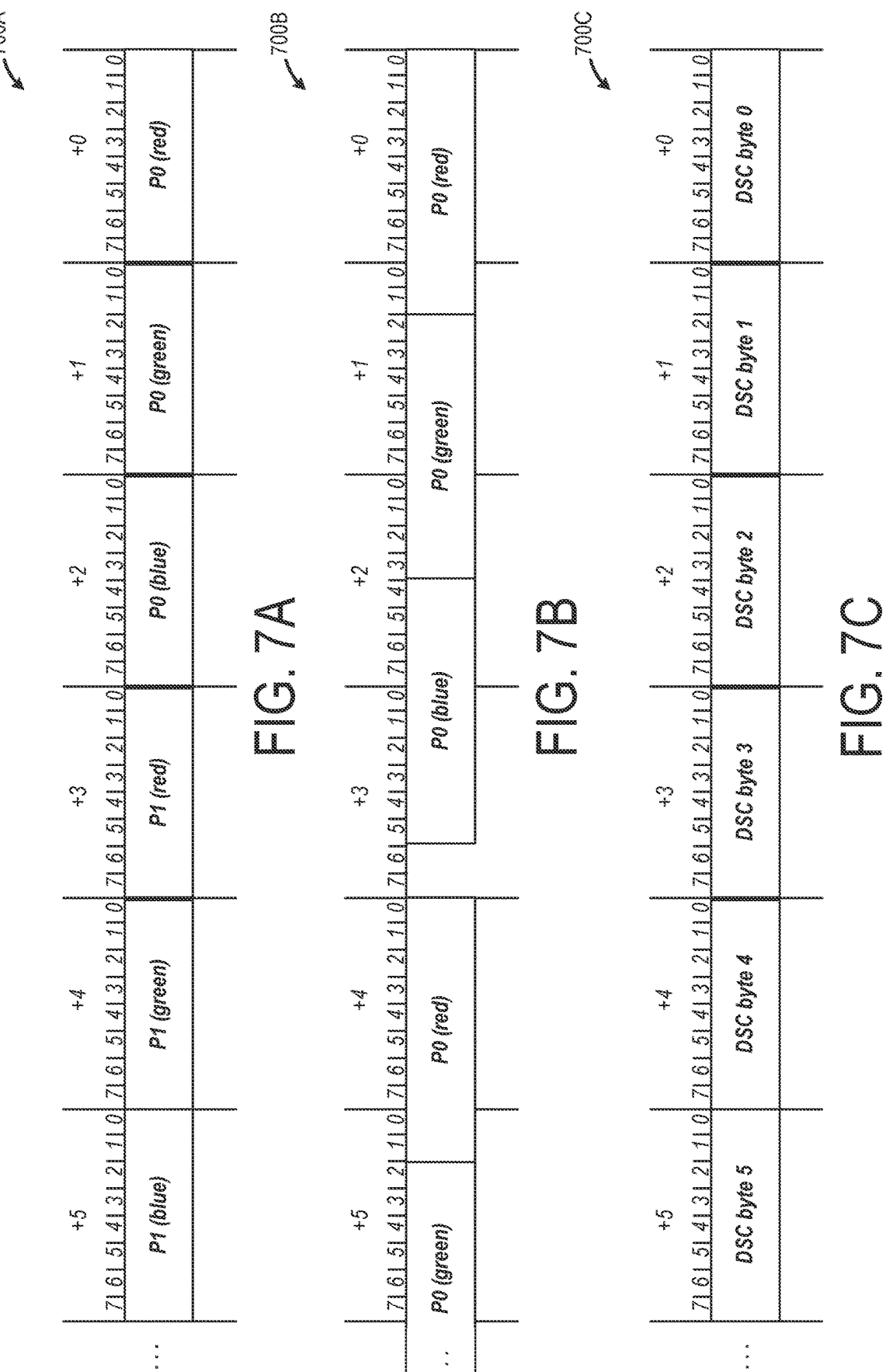
FIGS. 7A-7C illustrate example VDM TLP payload formats that may be used for display data messages in embodiments of the present disclosure.

FIGS. 7A-7C illustrate example VDM TLP payload formats 700 that may be used for display data messages in embodiments of the present disclosure. In particular, FIG. 7A illustrates an example payload format 700A for RGB8-formatted pixel data (where each pixel has an 8 bit encoding for red, green, and blue), FIG. 7B illustrates an example payload format 700B for RGB10-formatted pixel data (where each pixel has an 10 bit encoding for red, green, and blue), and FIG. 7C illustrates an example payload format 700C for DSC-formatted pixel data.

While embodiments herein may be used in any suitable type of computing device or system for streaming display pixel data to a display, the examples below describe example mobile computing devices/environments in which embodiments of the present disclosure can be implemented.

Figures 8A, 8B:
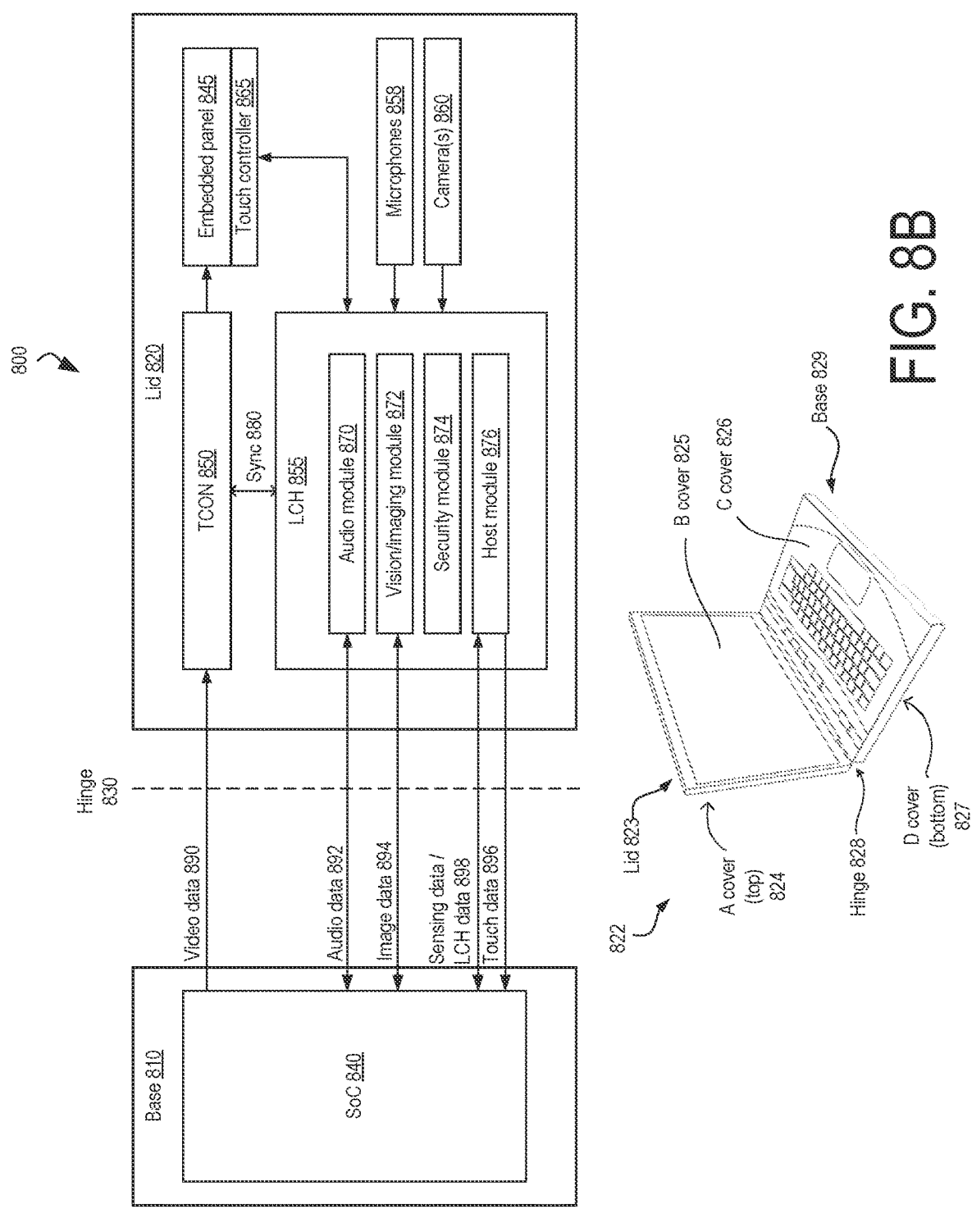
FIGS. 8A-8B illustrate example computing devices comprising a lid controller hub.

FIGS. 8A-8B illustrate an example mobile computing device in which aspects of the present disclosure may be incorporated. The example mobile computing devices shown implement a lid controller hub (e.g., 855) with various circuitries that can enable a reduced number of wires across a hinge of the device, i.e., from the base 810 to the lid 820. In current systems, in particular, the video data stream may need its own wire/connection across the hinge due to the synchronous nature of the video data protocol, e.g., embedded DisplayPort (eDP). However, with aspects of the present disclosure, it may be possible to incorporate each of the data streams shown in FIG. 8A, i.e., video data, audio data, image data, etc. across a single I/O connection, e.g., a PCIe connection, CXL connection, USB connection, etc.

FIG. 8A illustrates a block diagram of an example mobile computing device comprising a lid controller hub. The computing device 800 comprises a base 810 connected to a lid 820 by a hinge 830. The mobile computing device (also referred to herein as "user device") 800 can be a laptop or a mobile computing device with a similar form factor. The base 810 comprises a host system-on-a-chip (SoC) 840 that comprises one or more processor units integrated with one or more additional components, such as a memory controller, graphics processing unit (GPU), caches, an image processing module, and other components described herein. The base 810 can further comprise a physical keyboard, touchpad, battery, memory, storage, and external ports. The lid 820 comprises an embedded display panel 845, a timing controller (TCON) 850, a lid controller hub (LCH) 855, microphones 858, one or more cameras 860, and a touch controller 865. TCON 850 converts video data 890 received from the SoC 840 into signals that drive the display panel 845.

The display panel 845 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. A touch controller 865 drives the touchscreen technology utilized in the display panel 845 and collects touch sensor data provided by the employed touchscreen technology. The display panel 845 can comprise a touchscreen comprising one or more dedicated layers for implementing touch capabilities or 'in-cell' or 'on-cell' touchscreen technologies that do not require dedicated touchscreen layers.

The microphones 858 can comprise microphones located in the bezel of the lid or in-display microphones located in the display area, the region of the panel that displays content. The one or more cameras 860 can similarly comprise cameras located in the bezel or in-display cameras located in the display area.

LCH 855 comprises an audio module 870, a vision/imaging module 872, a security module 874, and a host module 876. The audio module 870, the vision/imaging module 872 and the host module 876 interact with lid sensors process the sensor data generated by the sensors. The audio module 870 interacts with the microphones 858 and processes audio sensor data generated by the microphones 858, the vision/imaging module 872 interacts with the one or more cameras 860 and processes image sensor data generated by the one or more cameras 860, and the host module 876 interacts with the touch controller 865 and processes touch sensor data generated by the touch controller 865. A synchronization signal 880 is shared between the timing controller 850 and the lid controller hub 855. The synchronization signal 880 can be used to synchronize the sampling of touch sensor data and the delivery of touch sensor data to the SoC 840 with the refresh rate of the display panel 845 to allow for a smooth and responsive touch experience at the system level.

As used herein, the phrase "sensor data" can refer to sensor data generated or provided by sensor as well as sensor data that has undergone subsequent processing. For example, image sensor data can refer to sensor data received at a frame router in a vision/imaging module as well as processed sensor data output by a frame router processing stack in a vision/imaging module. The phrase "sensor data" can also refer to discrete sensor data (e.g., one or more images captured by a camera) or a stream of sensor data (e.g., a video stream generated by a camera, an audio stream generated by a microphone). The phrase "sensor data" can further refer to metadata generated from the sensor data, such as a gesture determined from touch sensor data or a head orientation or facial landmark information generated from image sensor data.

The audio module 870 processes audio sensor data generated by the microphones 858 and in some embodiments enables features such as Wake on Voice (causing the device 800 to exit from a low-power state when a voice is detected in audio sensor data), Speaker ID (causing the device 800 to exit from a low-power state when an authenticated user's voice is detected in audio sensor data), acoustic context awareness (e.g., filtering undesirable background noises), speech and voice pre-processing to condition audio sensor data for further processing by neural network accelerators, dynamic noise reduction, and audio-based adaptive thermal solutions.

The vision/imaging module 872 processes image sensor data generated by the one or more cameras 860 and in various embodiments can enable features such as Wake on Face (causing the device 800 to exit from a low-power state when a face is detected in image sensor data) and Face ID (causing the device 800 to exit from a low-power state when an authenticated user's face is detected in image sensor data). In some embodiments, the vision/imaging module 872 can enable one or more of the following features: head orientation detection, determining the location of facial landmarks (e.g., eyes, mouth, nose, eyebrows, cheek) in an image, and multi-face detection.

The host module 876 processes touch sensor data provided by the touch controller 865. The host module 876 is able to synchronize touch-related actions with the refresh rate of the embedded panel 845. This allows for the synchronization of touch and display activities at the system level, which provides for an improved touch experience for any application operating on the mobile computing device.

The hinge 830 can be any physical hinge that allows the base 810 and the lid 820 to be rotatably connected. The wires that pass across the hinge 830 comprise wires for passing video data 890 from the SoC 840 to the TCON 850, wires for passing audio data 892 between the SoC 840 and the audio module 870, wires for providing image data 894 from the vision/imaging module 872 to the SoC 840, wires for providing touch data 896 from the LCH 855 to the SoC 840, and wires for providing data determined from image sensor data and other information generated by the LCH 855 from the host module 876 to the SoC 840. In some embodiments, data shown as being passed over different sets of wires between the SoC and LCH are communicated over the same set of wires. For example, in some embodiments, all of the different types of data shown can be sent over a single PCIe-based or USB-based data bus.

In some embodiments, the lid 820 is removably attachable to the base 810. In some embodiments, the hinge can allow the base 810 and the lid 820 to rotate to substantially 360 degrees with respect to each other. In some embodiments, the hinge 830 carries fewer wires to communicatively couple the lid 820 to the base 810 relative to existing computing devices that do not have an LCH. This reduction in wires across the hinge 830 can result in lower device cost, not just due to the reduction in wires, but also due to being a simpler electromagnetic and radio frequency interface (EMI/RFI) solution.

The components illustrated in FIG. 8A as being located in the base of a mobile computing device can be located in a base housing and components illustrated in FIG. 8A as being located in the lid of a mobile computing device can be located in a lid housing.

FIG. 8B illustrates a perspective view of another example mobile computing comprising a lid controller hub. The mobile computing device 822 can be a laptop or other mobile computing device with a similar form factor, such as a foldable tablet or smartphone. The lid 823 comprises an "A cover" 824 that is the world-facing surface of the lid 823 when the mobile computing device 822 is in a closed configuration and a "B cover" 825 that comprises a user-facing display when the lid 823 is open. The base 829 comprises a "C cover" 826 that comprises a keyboard that is upward facing when the device 822 is an open configuration and a "D cover" 827 that is the bottom of the base 829. In some embodiments, the base 829 comprises the primary computing resources (e.g., host processor unit(s), GPU) of the device 822, along with a battery, memory, and storage, and communicates with the lid 823 via wires that pass through a hinge 828. Thus, in embodiments where the mobile computing device is a dual-display device, such as a dual display laptop, tablet, or smartphone, the base can be regarded as the device portion comprising host processor units and the lid can be regarded as the device portion comprising an LCH. A Wi-Fi antenna can be located in the base or the lid of any computing device described herein.

In other embodiments, the computing device 822 can be a dual display device with a second display comprising a portion of the C cover 826. For example, in some embodiments, an "always-on" display (AOD) can occupy a region of the C cover below the keyboard that is visible when the lid 823 is closed. In other embodiments, a second display covers most of the surface of the C cover and a removable keyboard can be placed over the second display or the second display can present a virtual keyboard to allow for keyboard input.

Figure 9:
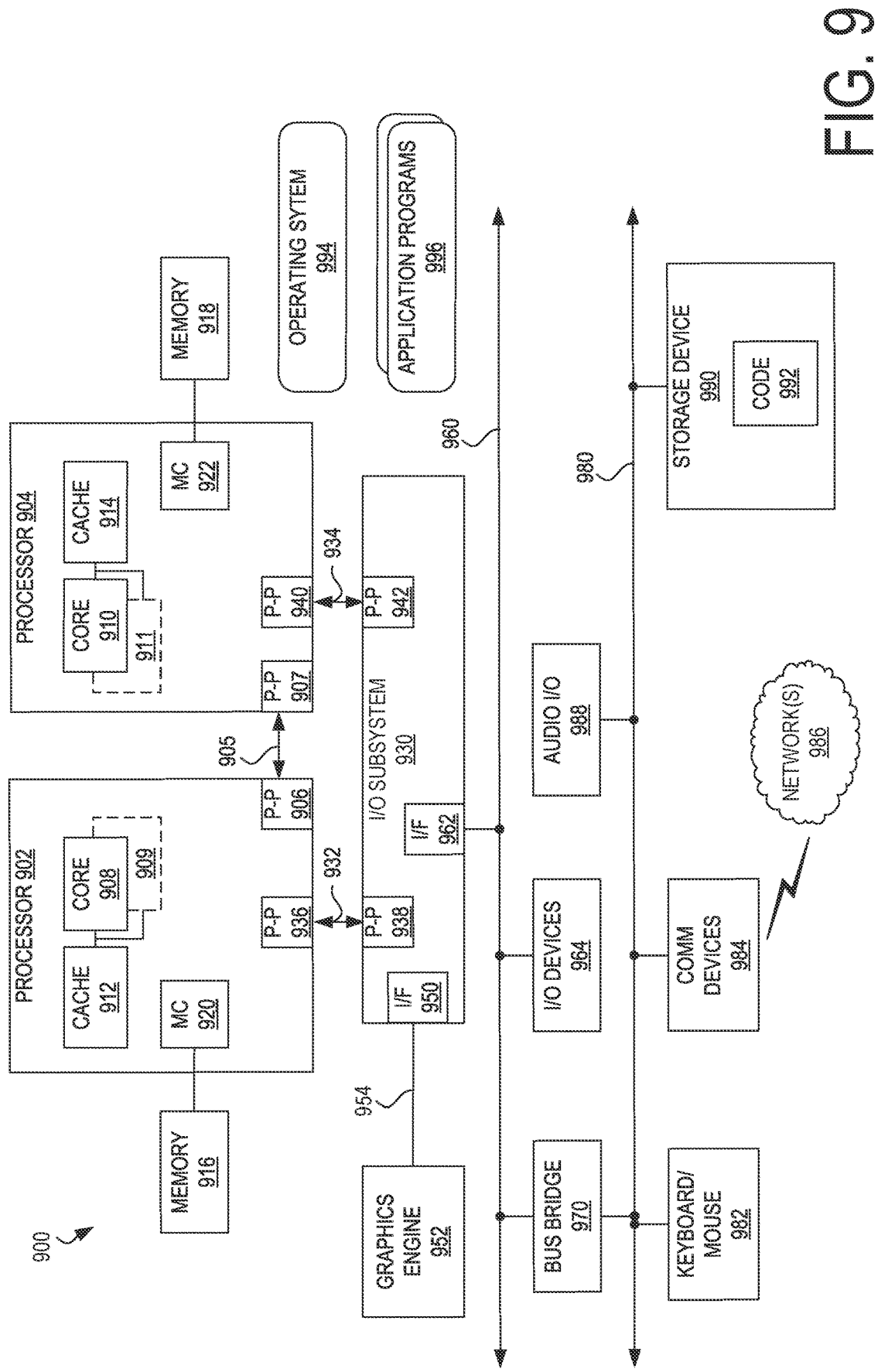
FIG. 9 is a block diagram of computing device components in a base of an example mobile computing device comprising a lid controller hub.

FIG. 9 is a block diagram of computing device components in a base of an example mobile computing device comprising a lid controller hub. Generally, components shown in FIG. 9 can communicate with other shown components, including those in a lid controller hub, although not all connections are shown, for ease of illustration. The components 900 comprise a multiprocessor system comprising a first processor 902 and a second processor 904 and is illustrated as comprising point-to-point (P-P) interconnects. For example, a point-to-point (P-P) interface 906 of the processor 902 is coupled to a point-to-point interface 907 of the processor 904 via a point-to-point interconnection 905. It is to be understood that any or all of the point-to-point interconnects illustrated in FIG. 9 can be alternatively implemented as a multi-drop bus, and that any or all buses illustrated in FIG. 9 could be replaced by point-to-point interconnects.

As shown in FIG. 9, the processors 902 and 904 are multicore processors. Processor 902 comprises processor cores 908 and 909, and processor 904 comprises processor cores 910 and 911. Processor cores 908-911 can execute computer-executable instructions in a manner similar to that discussed below in connection with FIG. 10, or in other manners.

Processors 902 and 904 further comprise at least one shared cache memory 912 and 914, respectively. The shared caches 912 and 914 can store data (e.g., instructions) utilized by one or more components of the processor, such as the processor cores 908-909 and 910-911. The shared caches 912 and 914 can be part of a memory hierarchy for the device. For example, the shared cache 912 can locally store data that is also stored in a memory 916 to allow for faster access to the data by components of the processor 902. In some embodiments, the shared caches 912 and 914 can comprise multiple cache layers, such as level 1 (L1), level 2 (L2), level 3 (L3), level 4 (L4), and/or other caches or cache layers, such as a last level cache (LLC).

Although two processors are shown, the device can comprise any number of processors or other compute resources, including those in a lid controller hub. Further, a processor can comprise any number of processor cores. A processor can take various forms such as a central processing unit, a controller, a graphics processor, an accelerator (such as a graphics accelerator, digital signal processor (DSP), or AI accelerator)). A processor in a device can be the same as or different from other processors in the device. In some embodiments, the device can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 902 and 904 reside in a multi-chip package. As used herein, the terms "processor unit" and "processing unit" can refer to any processor, processor core, component, module, engine, circuitry or any other processing element described herein. A processor unit or processing unit can be implemented in hardware, software, firmware, or any combination thereof capable of. A lid controller hub can comprise one or more processor units.

Processors 902 and 904 further comprise memory controller logic (MC) 920 and 922. As shown in FIG. 9, MCs 920 and 922 control memories 916 and 918 coupled to the processors 902 and 904, respectively. The memories 916 and 918 can comprise various types of memories, such as volatile memory (e.g., dynamic random-access memories (DRAM), static random-access memory (SRAM)) or non-volatile memory (e.g., flash memory, solid-state drives, chalcogenide-based phase-change non-volatile memories). While MCs 920 and 922 are illustrated as being integrated into the processors 902 and 904, in alternative embodiments, the MCs can be logic external to a processor, and can comprise one or more layers of a memory hierarchy.

Processors 902 and 904 are coupled to an Input/Output (I/O) subsystem 930 via P-P interconnections 932 and 934. The point-to-point interconnection 932 connects a point-to-point interface 936 of the processor 902 with a point-to-point interface 938 of the I/O subsystem 930, and the point-to-point interconnection 934 connects a point-to-point interface 940 of the processor 904 with a point-to-point interface 942 of the I/O subsystem 930. Input/Output subsystem 930 further includes an interface 950 to couple I/O subsystem 930 to a graphics module 952, which can be a high-performance graphics module. The I/O subsystem 930 and the graphics module 952 are coupled via a bus 954. Alternately, the bus 954 could be a point-to-point interconnection.

Input/Output subsystem 930 is further coupled to a first bus 960 via an interface 962. The first bus 960 can be a Peripheral Component Interconnect (PCI) bus, a PCI Express bus, another third generation I/O interconnection bus or any other type of bus.

Various I/O devices 964 can be coupled to the first bus 960. A bus bridge 970 can couple the first bus 960 to a second bus 980. In some embodiments, the second bus 980 can be a low pin count (LPC) bus. Various devices can be coupled to the second bus 980 including, for example, a keyboard/mouse 982, audio I/O devices 988 and a storage device 990, such as a hard disk drive, solid-state drive or other storage device for storing computer-executable instructions (code) 992. The code 992 can comprise computer-executable instructions for performing technologies described herein. Additional components that can be coupled to the second bus 980 include communication device(s) or unit(s) 984, which can provide for communication between the device and one or more wired or wireless networks 986 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 902.11 standard and its supplements).

The device can comprise removable memory such as flash memory cards (e.g., SD (Secure Digital) cards), memory sticks, Subscriber Identity Module (SIM) cards). The memory in the computing device (including caches 912 and 914, memories 916 and 918 and storage device 990, and memories in the lid controller hub) can store data and/or computer-executable instructions for executing an operating system 994, or application programs 996. Example data includes web pages, text messages, images, sound files, video data, sensor data or any other data received from a lid controller hub, or other data sets to be sent to and/or received from one or more network servers or other devices by the device via one or more wired or wireless networks, or for use by the device. The device can also have access to external memory (not shown) such as external hard drives or cloud-based storage.

The operating system 994 can control the allocation and usage of the components illustrated in FIG. 9 and support one or more application programs 996. The application programs 996 can include common mobile computing device applications (e.g., email applications, calendars, contact managers, web browsers, messaging applications) as well as other computing applications.

The device can support various input devices, such as a touchscreen, microphones, cameras (monoscopic or stereoscopic), trackball, touchpad, trackpad, mouse, keyboard, proximity sensor, light sensor, pressure sensor, infrared sensor, electrocardiogram (ECG) sensor, PPG (photoplethysmogram) sensor, galvanic skin response sensor, and one or more output devices, such as one or more speakers or displays. Any of the input or output devices can be internal to, external to or removably attachable with the device. External input and output devices can communicate with the device via wired or wireless connections.

In addition, the computing device can provide one or more natural user interfaces (NUIs). For example, the operating system 994, applications 996, or a lid controller hub can comprise speech recognition as part of a voice user interface that allows a user to operate the device via voice commands. Further, the device can comprise input devices and components that allows a user to interact with the device via body, hand, or face gestures.

The device can further comprise one or more communication components 984. The components 984 can comprise wireless communication components coupled to one or more antennas to support communication between the device and external devices. Antennas can be located in a base, lid, or other portion of the device. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device can further include at least one input/output port (which can be, for example, a USB, IEEE 1394 (FireWire), Ethernet and/or RS-232 port) comprising physical connectors; a power supply (such as a rechargeable battery); a satellite navigation system receiver, such as a GPS receiver; a gyroscope; an accelerometer; and a compass. A GPS receiver can be coupled to a GPS antenna. The device can further include one or more additional antennas coupled to one or more additional receivers, transmitters and/or transceivers to enable additional functions.

FIG. 9 illustrates one example computing device architecture. Computing devices based on alternative architectures can be used to implement technologies described herein. For example, instead of the processors 902 and 904, and the graphics module 952 being located on discrete integrated circuits, a computing device can comprise a SoC (system-on-a-chip) integrated circuit incorporating one or more of the components illustrated in FIG. 9. In one example, an SoC can comprise multiple processor cores, cache memory, a display driver, a GPU, multiple I/O controllers, an AI accelerator, an image processing unit driver, I/O controllers, an AI accelerator, an image processor unit. Further, a computing device can connect elements via bus or point-to-point configurations different from that shown in FIG. 9. Moreover, the illustrated components in FIG. 9 are not required or all-inclusive, as shown components can be removed and other components added in alternative embodiments.

Figure 10:
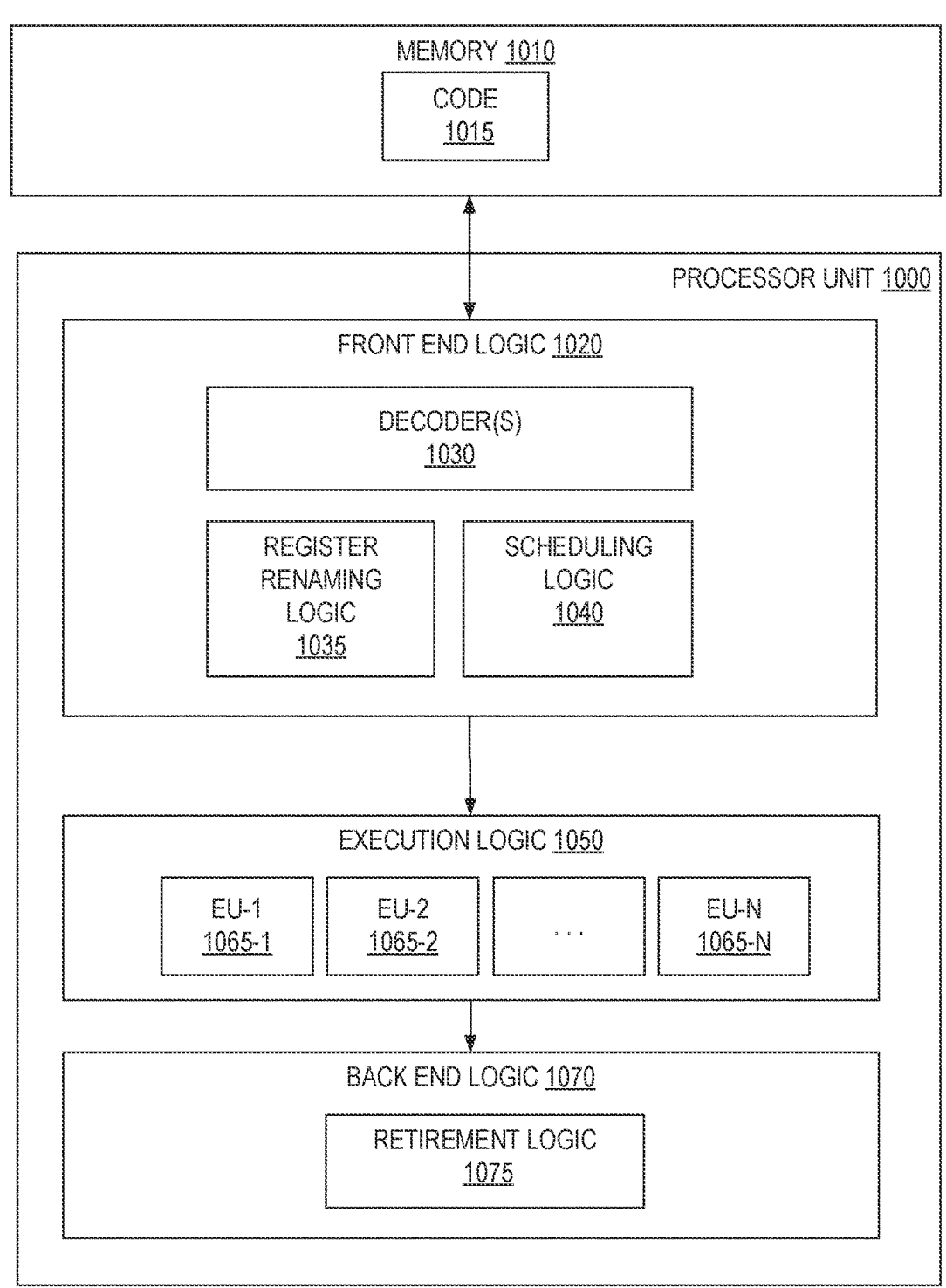
FIG. 10 is a block diagram of an exemplary processor unit that can execute instructions as part of implementing technologies described herein.

FIG. 10 is a block diagram of an example processor unit 1000 to execute computer-executable instructions as part of implementing a lid controller hub. The processor unit 1000 can be any type of processor or processor core, such as a microprocessor, an embedded processor, a digital signal processor (DSP), network processor, or accelerator. The processor unit 1000 can be a single-threaded core or a multithreaded core in that it may include more than one hardware thread context (or "logical processor") per core.

FIG. 10 also illustrates a memory 1010 coupled to the processor 1000. The memory 1010 can be any memory described herein or any other memory known to those of skill in the art. The memory 1010 can store computer-executable instructions 1015 (code) executable by the processor unit 1000.

The processor core comprises front-end logic 1020 that receives instructions from the memory 1010. An instruction can be processed by one or more decoders 1030. The decoder 1030 can generate as its output a micro operation such as a fixed width micro operation in a predefined format, or generate other instructions, microinstructions, or control signals, which reflect the original code instruction. The front-end logic 1020 further comprises register renaming logic 1035 and scheduling logic 1040, which generally allocate resources and queues operations corresponding to converting an instruction for execution.

The processor unit 1000 further comprises execution logic 1050, which comprises one or more execution units (EUs) 1065-1 through 1065-N. Some processor core embodiments can include a number of execution units dedicated to specific functions or sets of functions. Other embodiments can include only one execution unit or one execution unit that can perform a particular function. The execution logic 1050 performs the operations specified by code instructions. After completion of execution of the operations specified by the code instructions, back end logic 1070 retires instructions using retirement logic 1075. In some embodiments, the processor unit 1000 allows out of order execution but requires in-order retirement of instructions. Retirement logic 1075 can take a variety of forms as known to those of skill in the art (e.g., re-order buffers or the like).

The processor unit 1000 is transformed during execution of instructions, at least in terms of the output generated by the decoder 1030, hardware registers and tables utilized by the register renaming logic 1035, and any registers (not shown) modified by the execution logic 1050. Although not illustrated in FIG. 10, a processor can include other elements on an integrated chip with the processor unit 1000. For example, a processor may include additional elements such as memory control logic, one or more graphics modules, I/O control logic and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer-readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hard-wired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as continuous itemset generation circuitry, entropy-based discretization circuitry, etc. A computer device referred to as being programmed to perform a method can be programmed to perform the method via software, hardware, firmware or combinations thereof.

In some embodiments, a lid controller hub is a packaged integrated circuit comprising components (modules, ports, controllers, driver, timings, blocks, accelerators, processors, etc.) described herein as being a part of the lid controller hub. Lid controller hub components can be implemented as dedicated circuitry, programmable circuitry that operates firmware or software, or a combination thereof. Thus, modules can be alternately referred to as "circuitry" (e.g., "image preprocessing circuitry"). Modules can also be alternately referred to as "engines" (e.g., "security engine", "host engine", "vision/imaging engine," "audio engine") and an "engine" can be implemented as a combination of hardware, software, firmware or a combination thereof. Further, lid controller hub modules (e.g., audio module, vision/imaging module) can be combined with other modules and individual modules can be split into separate modules.

The use of reference numbers in the claims and the specification is meant as in aid in understanding the claims and the specification and is not meant to be limiting.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infra-red communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B, and C. Further, as used in this application and in the claims, a list of items joined by the term "at least one of" can mean any combination of the listed terms. For example, the phrase "at least one of A, B, or C" can mean A; B; C; A and B; A and C; B and C; or A, B, and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Additional examples of the presently described display pixel data streaming techniques include the following, non-limiting implementations. Each of the following non-limiting examples may stand on its own or may be combined in any permutation or combination with any one or more of the other examples provided below or throughout the present disclosure.

Example 1 is a system comprising: a display source comprising circuitry to: generate pixel data for a frame to be displayed; generate a display update notification message comprising information about the pixel data; and generate a display data message comprising the pixel data; translation circuitry to: receive the display update notification message from the display source; generate one or more first packets formatted according to an input/output (I/O) protocol based on the display update notification message, the first packets comprising the information in the display update notification message; receive the display data message from the display source; and generate one or more second packets formatted according to the I/O protocol based on the display data message, the second packets comprising the pixel data; and input/output circuitry to transmit the first and second data packets across a link based on the I/O protocol.

Example 2 includes the subject matter of Example 1, wherein the translation circuitry is further to: receive an indication of flow control credits granted for transmitting data across the link; and track the number of flow control credits based on the generated first and second data packets.

Example 3 includes the subject matter of Example 2, wherein the translation circuitry is further to transmit an indication of an active link state to the display source in response to receiving the indication of the granted flow control credits, and the display source is to generate the display data message based on receiving the indication.

Example 4 includes the subject matter of Example 3, wherein the translation circuitry is further to transmit an indication of an inactive link state to the display source in response to detecting no additional flow control credits remaining.

Example 5 includes the subject matter of any one of Examples 1-4, wherein the pixel data comprises data for a subset of pixels of the frame, the display update notification message includes an indication of a partial update of the frame, and the first data packets include one or more bits indicating the partial update of the frame, a start x-coordinate for the partial update, a stop x-coordinate for the partial update, and start y-coordinate for the partial update, and a stop y-coordinate for the partial update.

Example 6 includes the subject matter of any one of Examples 1-4, wherein the pixel data comprises data for all pixels of a frame, the display update notification message includes an indication of a full update of the frame, and the first data packets include one or more bits indicating the full update of the frame.

Example 7 includes the subject matter of any one of Examples 1-6, wherein the display update notification message includes an indication of an amount of pixel data to be included in the display data message, and the first data packets include one or more bits indicating the amount of pixel data.

Example 8 includes the subject matter of any one of Examples 1-7, wherein the translation circuitry is to include an end of message (EOM) indication in a header of a last of the second data packets.

Example 9 includes the subject matter of any one of Examples 1-8, wherein the display source is further to generate a cyclic redundancy check (CRC) code based on the pixel data and generate a CRC notification message including the CRC code, and the translation circuitry is the generate one or more third data packets formatted according to the I/O protocol, the third data packets comprising the CRC code.

Example 10 includes the subject matter of any one of Examples 1-8, wherein the I/O protocol is one of a Peripheral Component Interconnect Express (PCIe)-based protocol and a Universal Serial Bus (USB)-based protocol.

Example 11 includes the subject matter of Example 10, wherein the I/O protocol is a PCIe-based protocol, and the first and second data packets are formatted as vendor defined message (VDM) transaction layer packets (TLPs).

Example 12 includes one or more computer-readable media comprising instructions that, when executed by an apparatus of a user device, cause the apparatus to: receive a display update notification message from a display source, the display update notification message comprising information about pixel data for a frame to be displayed; generate one or more first packets formatted according to an input/output (I/O) protocol based on the display update notification message, the first packets comprising the information in the display update notification message; receive a display data message from the display source, the display data message comprising the pixel data; generate one or more second packets formatted according to the I/O protocol based on the display data message, the second packets comprising the pixel data; and cause the first and second data packets to be transmitted across a link according to the I/O protocol.

Example 13 includes the subject matter of Example 12, wherein the instructions are further to: receive an indication of flow control credits granted for transmitting data across the link; and track the number of flow control credits based on the generated first and second data packets.

Example 14 includes the subject matter of Example 13, wherein the instructions are further to transmit an indication of an active link state to the display source in response to receiving the indication of the granted flow control credits Example 15 includes the subject matter of Example 14, wherein the instructions are further to transmit an indication of an inactive link state to the display source in response to detecting no additional flow control credits remaining.

Example 16 includes the subject matter of any one of Examples 12-15, wherein the pixel data comprises data for a subset of pixels of the frame, the display update notification message includes an indication of a partial update of the frame, and the first data packets include one or more bits indicating the partial update of the frame, a start x-coordinate for the partial update, a stop x-coordinate for the partial update, and start y-coordinate for the partial update, and a stop y-coordinate for the partial update.

Example 17 includes the subject matter of any one of Examples 12-15, wherein the pixel data comprises data for all pixels of a frame, the display update notification message includes an indication of a full update of the frame, and the first data packets include one or more bits indicating the full update of the frame.

Example 18 includes the subject matter of any one of Examples 12-17, wherein the display update notification message includes an indication of an amount of pixel data to be included in the display data message, and the first data packets include one or more bits indicating the amount of pixel data.

Example 19 includes the subject matter of any one of Examples 12-18, wherein the instructions are to include an end of message (EOM) indication in a header of a last of the second data packets.

Example 20 includes the subject matter of any one of Examples 12-19, wherein the instructions are further to generate one or more third data packets formatted according to the I/O protocol, the third data packets comprising a CRC code associated with the pixel data in the second packets.

Example 21 includes the subject matter of any one of Examples 12-20, wherein the I/O protocol is one of a Peripheral Component Interconnect Express (PCIe)-based protocol and a Universal Serial Bus (USB)-based protocol.

Example 22 includes the subject matter of Example 21, wherein the I/O protocol is a PCIe-based protocol, and the first and second data packets are formatted as vendor defined message (VDM) transaction layer packets (TLPs).

Example 23 includes a method comprising: receiving a display update notification message from a display source, the display update notification message comprising information about pixel data for a frame to be displayed; generating one or more first packets formatted according to an input/output (I/O) protocol based on the display update notification message, the first packets comprising the information in the display update notification message; receiving a display data message from the display source, the display data message comprising the pixel data; generating one or more second packets formatted according to the I/O protocol based on the display data message, the second packets comprising the pixel data; and transmitting the first and second data packets across a link according to the I/O protocol.

Example 24 includes the subject matter of Example 23, further comprising: receiving an indication of flow control credits granted for transmitting data across the link; and tracking the number of flow control credits based on the generated first and second data packets.

Example 25 includes the subject matter of Example 24, further comprising transmitting an indication of an active link state to the display source in response to receiving the indication of the granted flow control credits Example 26 includes the subject matter of Example 25, further comprising transmitting an indication of an inactive link state to the display source in response to detecting no additional flow control credits remaining.

Example 27 includes the subject matter of any one of Examples 23-26, wherein the pixel data comprises data for a subset of pixels of the frame, the display update notification message includes an indication of a partial update of the frame, and the first data packets include one or more bits indicating the partial update of the frame, a start x-coordinate for the partial update, a stop x-coordinate for the partial update, and start y-coordinate for the partial update, and a stop y-coordinate for the partial update.

Example 28 includes the subject matter of any one of Examples 23-26, wherein the pixel data comprises data for all pixels of a frame, the display update notification message includes an indication of a full update of the frame, and the first data packets include one or more bits indicating the full update of the frame.

Example 29 includes the subject matter of any one of Examples 23-28, wherein the display update notification message includes an indication of an amount of pixel data to be included in the display data message, and the first data packets include one or more bits indicating the amount of pixel data.

Example 30 includes the subject matter of any one of Examples 23-29, wherein a header of a last of the second data packets includes an end of message (EOM) indication.

Example 31 includes the subject matter of any one of Examples 23-30, further comprising generating one or more third data packets formatted according to the I/O protocol, the third data packets comprising a CRC code associated with the pixel data in the second packets.

Example 32 includes the subject matter of any one of Examples 23-31, wherein the I/O protocol is one of a Peripheral Component Interconnect Express (PCIe)-based protocol and a Universal Serial Bus (USB)-based protocol.

Example 33 includes the subject matter of Example 32, wherein the I/O protocol is a PCIe-based protocol, and the first and second data packets are formatted as vendor defined message (VDM) transaction layer packets (TLPs).

Example 34 includes an apparatus comprising means to perform a method of any one of Examples 23-33.

Example 35 includes machine-readable storage including machine-readable instructions, when executed, to implement a method or realize an apparatus of any one of Examples 23-34.

The invention claimed is:
1. A system comprising:
a display source comprising circuitry to:
   generate pixel data for a frame to be displayed;
   generate a display update notification message comprising information about the pixel data; and
   generate a display data message comprising the pixel data;
translation circuitry to:
   receive the display update notification message from the display source;
   generate one or more first data packets formatted according to an input/output (I/O) protocol based on the display update notification message, the first data packets comprising the information in the display update notification message;
   receive an indication from a display sink in response to the first data packets indicating the display sink is ready to receive data and indicating flow control credits granted for transmitting data to the display sink;
   transmit an active link state indication to the display source in response to receiving the indication from the display sink;
   receive the display data message from the display source in response to the active link state indication;
   generate one or more second data packets formatted according to the I/O protocol based on the display data message, the second data packets comprising the pixel data;

track the flow control credits based on the generated second data packets; and input/output circuitry to transmit the first and second data packets to the display sink across a link based on the I/O protocol, wherein the I/O protocol is one of a Peripheral Component Interconnect Express (PCIe)-based protocol and a Universal Serial Bus (USB)-based protocol.

2. The system of claim 1, wherein the translation circuitry is further to transmit an indication of an inactive link state to the display source in response to detecting no additional second data packets remain to be sent.

3. The system of claim 1, wherein the pixel data comprises data for a subset of pixels of the frame, the display update notification message includes an indication of a partial update of the frame, and the first data packets include one or more bits indicating the partial update of the frame, a start x-coordinate for the partial update, a stop x-coordinate for the partial update, and start y-coordinate for the partial update, and a stop y-coordinate for the partial update.

4. The system of claim 1, wherein the pixel data comprises data for all pixels of a frame, the display update notification message includes an indication of a full update of the frame, and the first data packets include one or more bits indicating the full update of the frame.

5. The system of claim 1, wherein the display update notification message includes an indication of an amount of pixel data to be included in the display data message, and the first data packets include one or more bits indicating the amount of pixel data.

6. The system of claim 1, wherein the translation circuitry is to include an end of message (EOM) indication in a header of a last of the second data packets.

7. The system of claim 1, wherein the display source is further to generate a cyclic redundancy check (CRC) code based on the pixel data and generate a CRC notification message including the CRC code, and the translation circuitry is further to generate one or more third data packets formatted according to the I/O protocol, the third data packets comprising the CRC code.

8. The system of claim 1, wherein the I/O protocol is a PCIe-based protocol, and the first and second data packets are formatted as vendor defined message (VDM) transaction layer packets (TLPs).

9. One or more non-transitory computer-readable media comprising instructions that, when executed by an apparatus of a user device, cause the apparatus to:

receive a display update notification message from a display source, the display update notification message comprising information about pixel data for a frame to be displayed;

generate one or more first data packets formatted according to an input/output (I/O) protocol based on the display update notification message, the first data packets comprising the information in the display update notification message, wherein the I/O protocol is one of a Peripheral Component Interconnect Express (PCIe)-based protocol and a Universal Serial Bus (USB)-based protocol;

cause the first data packets to be transmitted to a display sink across a link according to the I/O protocol;

receive an indication from the display sink in response to the first data packets indicating the display sink is ready to receive data and indicating flow control credits granted for transmitting data to the display sink;

transmit an active link state indication to the display source in response to receiving the indication from the display sink;

receive a display data message from the display source based on the active link state indication, the display data message comprising the pixel data;

generate one or more second data packets formatted according to the I/O protocol based on the display data message, the second data packets comprising the pixel data;

track the flow control credits based on the generated second data packets; and cause the second data packets to be transmitted to the display sink across the link according to the I/O protocol.

10. The non-transitory computer-readable media of claim 9, wherein the display data message does not include timing data corresponding to the pixel data.

11. The non-transitory computer-readable media of claim 10, wherein the instructions are further to transmit an indication of an inactive link state to the display source in response to detecting no additional flow control credits remaining.

12. The non-transitory computer-readable media of claim 9, wherein the pixel data comprises data for a subset of pixels of the frame, the display update notification message includes an indication of a partial update of the frame, and the first data packets include one or more bits indicating the partial update of the frame, a start x-coordinate for the partial update, a stop x-coordinate for the partial update, and start y-coordinate for the partial update, and a stop y-coordinate for the partial update.

13. The non-transitory computer-readable media of claim 9, wherein the pixel data comprises data for all pixels of a frame, the display update notification message includes an indication of a full update of the frame, and the first data packets include one or more bits indicating the full update of the frame.

14. The non-transitory computer-readable media of claim 9, wherein the display update notification message includes an indication of an amount of pixel data to be included in the display data message, and the first data packets include one or more bits indicating the amount of pixel data.

15. The non-transitory computer-readable media of claim 9, wherein the instructions are to include an end of message (EOM) indication in a header of a last of the second data packets.

16. The non-transitory computer-readable media of claim 9, wherein the instructions are further to generate one or more third data packets formatted according to the I/O protocol, the third data packets comprising a CRC code associated with the pixel data in the second data packets.

17. A method comprising:

receiving a display update notification message from a display source, the display update notification message comprising information about pixel data for a frame to be displayed;

generating one or more first packets formatted according to an input/output (I/O) protocol based on the display update notification message, the first packets comprising the information in the display update notification message, wherein the I/O protocol is one of a Peripheral Component Interconnect Express (PCIe)-based protocol and a Universal Serial Bus (USB)-based protocol;

causing the first packets to be transmitted to a display sink across a link according to the I/O protocol;

receive an indication from the display sink in response to the first packets indicating the display sink is ready to receive data and indicating flow control credits granted for transmitting data to the display sink across the link;

transmit an active link state indication to the display source in response to receiving the indication from the display sink;

receiving a display data message from the display source based on the active link state indication, the display data message comprising the pixel data;

generating one or more second packets formatted according to the I/O protocol based on the display data message, the second packets comprising the pixel data;

track the flow control credits based on the generated second packets; and causing the second packets to be transmitted to the display sink across the link according to the I/O protocol.

18. The method of claim 17, wherein the display data message does not include timing data corresponding to the pixel data.

19. The method of claim 18, further comprising transmitting an indication of an inactive link state to the display source in response to detecting no additional flow control credits remaining.

20. The system of claim 1, wherein the display data message does not include timing data corresponding to the pixel data.

* * * * *